US007913041B2

(12) United States Patent
Shen et al.

(10) Patent No.: US 7,913,041 B2
(45) Date of Patent: *Mar. 22, 2011

(54) CACHE RECONFIGURATION BASED ON ANALYZING ONE OR MORE CHARACTERISTICS OF RUN-TIME PERFORMANCE DATA OR SOFTWARE HINT

(75) Inventors: Xiaowei Shen, Hopewell Junction, NY (US); Balaram Sinharoy, Poughkeepsie, NY (US); Robert B. Tremaine, Stormville, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 230 days.

This patent is subject to a terminal disclaimer.

(21) Appl. No.: 12/130,752

(22) Filed: May 30, 2008

(65) Prior Publication Data
US 2008/0263278 A1 Oct. 23, 2008

Related U.S. Application Data

(63) Continuation of application No. 11/481,020, filed on Jul. 5, 2006, now Pat. No. 7,467,280.

(51) Int. Cl.
*G06F 12/00* (2006.01)
(52) U.S. Cl. ........ 711/129; 711/144; 711/145; 711/122; 713/300; 713/320; 702/130
(58) Field of Classification Search .................. 711/129, 711/144, 145, 122; 713/300, 320; 702/130
See application file for complete search history.

(56) References Cited

U.S. PATENT DOCUMENTS

| 5,367,653 | A | 11/1994 | Coyle et al. |
| 5,410,668 | A | 4/1995 | Hilton |
| 6,223,255 | B1 | 4/2001 | Argade |
| 6,317,351 | B2 | 11/2001 | Choi |
| 6,834,328 | B2 | 12/2004 | Dwarkadas et al. |
| 7,028,196 | B2 | 4/2006 | Soltis, et al. |
| 7,051,221 | B2 | 5/2006 | Clabes et al. |
| 7,219,207 | B2 | 5/2007 | Kim et al. |
| 7,257,678 | B2 * | 8/2007 | Golden et al. ............... 711/118 |
| 7,428,615 | B2 * | 9/2008 | Van Eijndhoven ........... 711/122 |
| 2003/0110012 | A1 | 6/2003 | Orenstien et al. |

(Continued)

OTHER PUBLICATIONS

The Cache Memory book, Jim Handy, Academic Press, Inc., 1993, pp. 5-8 and 64-84.*

*Primary Examiner* — Hong Kim
(74) *Attorney, Agent, or Firm* — Scully, Scott, Murphy & Presser, P.C.; Daniel P. Morris, Esq.

(57) ABSTRACT

A method for reconfiguring a cache memory is provided. The method in one aspect may include analyzing one or more characteristics of an execution entity accessing a cache memory and reconfiguring the cache based on the one or more characteristics analyzed. Examples of analyzed characteristic may include but are not limited to data structure used by the execution entity, expected reference pattern of the execution entity, type of an execution entity, heat and power consumption of an execution entity, etc. Examples of cache attributes that may be reconfigured may include but are not limited to associativity of the cache memory, amount of the cache memory available to store data, coherence granularity of the cache memory, line size of the cache memory, etc.

16 Claims, 3 Drawing Sheets

U.S. PATENT DOCUMENTS

| | | |
|---|---|---|
| 2004/0117669 A1 | 6/2004 | Wilson |
| 2004/0184340 A1* | 9/2004 | Dwarkadas et al. ..... 365/230.03 |
| 2005/0060126 A1 | 3/2005 | Coulson et al. |
| 2005/0080994 A1 | 4/2005 | Cohen et al. |
| 2005/0086029 A1* | 4/2005 | Cascaval et al. ............. 702/196 |
| 2005/0138293 A1* | 6/2005 | Singh ............................ 711/128 |
| 2005/0246499 A1 | 11/2005 | Saida et al. |
| 2006/0075192 A1 | 4/2006 | Golden et al. |
| 2006/0101289 A1 | 5/2006 | Dang et al. |
| 2006/0122805 A1 | 6/2006 | Coulson et al. |
| 2007/0028051 A1 | 2/2007 | Williamson et al. |
| 2007/0067575 A1 | 3/2007 | Morris et al. |
| 2007/0083783 A1* | 4/2007 | Ishihara et al. ............... 713/320 |
| 2007/0124538 A1 | 5/2007 | Abadeer et al. |
| 2007/0153015 A1 | 7/2007 | Tsao |

* cited by examiner

CACHE RECONFIGURATION BASED ON ANALYZING ONE OR MORE CHARACTERISTICS OF RUN-TIME PERFORMANCE DATA OR SOFTWARE HINT

RELATED APPLICATIONS

This application is a continuation of U.S. Ser. No. 11/481,020, filed Jul. 5, 2006, now U.S. Pat. No. 7,467,280 issued Dec. 16, 2008, the entire contents of which are incorporated herein by reference.

STATEMENT REGARDING FEDERALLY SPONSORED RESEARCH OR DEVELOPMENT

This invention was made with Government support under Contract No.:NBCH020056 (DARPA) awarded by Defense, Advanced Research Projects Agency. The Government has certain rights in this invention.

FIELD OF THE INVENTION

The present disclosure generally relates to computer processors and particularly to memory management and cache architectures.

BACKGROUND OF THE INVENTION

Cache memory is one of the critical elements in computer processors for achieving good performance on the processors. Generally, a cache is a smaller, faster memory used by a central processing unit of a computer to reduce the average time to access its data or instructions. The cache typically stores copies of the data from the most frequently used main memory locations. The fundamental idea of cache organization is that by keeping the most frequently accessed instructions and data in the fast cache memory, the average memory access time will approach the access time of the cache. A cache miss is costly because the data must then be fetched from a higher-level cache, main memory, or potentially another processor's cache on a multiprocessor, which incurs a delay because accessing the other memory is slower than accessing the cache memory. Thus, maximizing the cache's hit rate is one of the important factors in achieving good performance.

The configuration of a cache is a direct factor affecting the cache hit or miss rate for execution entities such as processes and threads that execute on a processor. It is often the case that different processes and threads require different cache configurations in order to maximize that process or thread's cache hit rate. In conventional cache design, however, many of the characteristics or attributes of the cache are set at design time. This is true even though programs have dynamic requirements for use of the cache. Accordingly what is needed is a method for allowing the hardware to reconfigure cache organization, for instance, based on dynamic or otherwise tracked information.

Various requirements that change over time sometimes can be known by the operating system or software. Also, the software or the operating system can determine different access patterns among different applications or threads. In other cases the operating system can proactively know the behavior of a given application. Therefore, it is also desirable to provide a mechanisms so that the software or operating system or the like can provide the information relating to the dynamic requirements of different programs, processes, threads, or the like, thereby allowing the hardware to configure the cache to suit the needs of the given application

BRIEF SUMMARY OF THE INVENTION

A method for reconfiguring cache memory is provided. The method in one aspect may include analyzing one or more characteristics of an execution entity accessing a cache memory and reconfiguring the cache dynamically based on the one or more characteristics analyzed. Examples of characteristic may include but are not limited to the data structure used by the execution entity, expected reference pattern of the execution entity, type of an execution entity, heat and power consumption of an execution entity, etc. Examples of cache attributes that may be reconfigured may include but are not limited to associativity of the cache memory, amount of the cache memory available to store data, coherence granularity of the cache memory, line size of the cache memory, etc.

The step of reconfiguring in one aspect may include changing the number of masked bits for mapping into cache memory to modify cache memory associativity. The step of reconfiguring in another aspect may include dividing a cache line into a plurality of sectors and accessing data of the cache line by one or more sectors. The method may further include instructing hardware as to which memory region should be cached by sectors and which memory region should be cached by entire cache lines. The method may also include associating an access bit with each sector of a cache line and setting an access bit to true if a processing element uses data of a sector associated with the access bit. In one aspect, the step of associating may include associating an access bit with each sector of a cache line in level-1 cache.

Still yet, the method may further associating a granularity bit with each sector of a cache line, the granularity bit for indicating whether a sector should be cached when one or more other sectors in the cache line are cached. The step of associating may include associating a granularity bit with each sector of a cache line in level-2 cache, the granularity bit for indicating whether the associated sector should be cached when one or more other sectors in the cache line are cached.

The step of analyzing in one aspect may be performed on-line while the execution entity is being run. In another aspect, the step of analyzing may be performed off-line. Yet in another aspect, the step of analyzing may be performed by software. In one aspect, the software may be an operating system.

A system for reconfiguring cache memory in one aspect may include a means for analyzing one or more characteristics of an execution entity accessing a cache memory and a means for reconfiguring the cache dynamically based on the one or more characteristics analyzed. The means for reconfiguring may include a means for modifying associativity of the cache memory, modifying amount of the cache memory available to store data, changing coherence granularity of the cache memory, or modifying line size of the cache memory, or combination thereof. The one or more characteristics of an execution entity may include size of data structure used by the execution entity, expected reference pattern of the execution entity, heat generated by the execution entity, or combination thereof.

A system for reconfiguring cache memory, in another aspect, may include lower-level cache memory comprising at least a plurality of cache lines, at least one of the cache lines divided into a plurality of sectors. The system also may include an access bit associated with each of the plurality of sectors of the lower-level cache memory, the access bit representing whether data of a sector associated with the access bit was used. The system may further include higher-level cache memory comprising at least a plurality of cache lines, at least one of the cache lines divided into a plurality of sectors. A granularity bit may be associated with each of the plurality of sectors of the higher-level cache memory, the granularity bit representing whether data of a sector associated with the granularity bit should be cached when one or more of other sectors in the same cache line are cached into the lower-level cache memory. A processor may be operable to use data of one or more sectors of the lower-level cache memory. The processor may be further operable to update one or more access bits respectively associated with the one or more sectors. The system may also include a means operable to update one or more granularity bits. In one aspect, the means operable to update one or more granularity bits may include software. The means operable to update one or more granularity bit may be operable to update one or more granularity bits based on an analysis performed on an execution entity.

Further features as well as the structure and operation of various embodiments are described in detail below with reference to the accompanying drawings. In the drawings, like reference numbers indicate identical or functionally similar elements.

DETAILED DESCRIPTION

Figure 1:
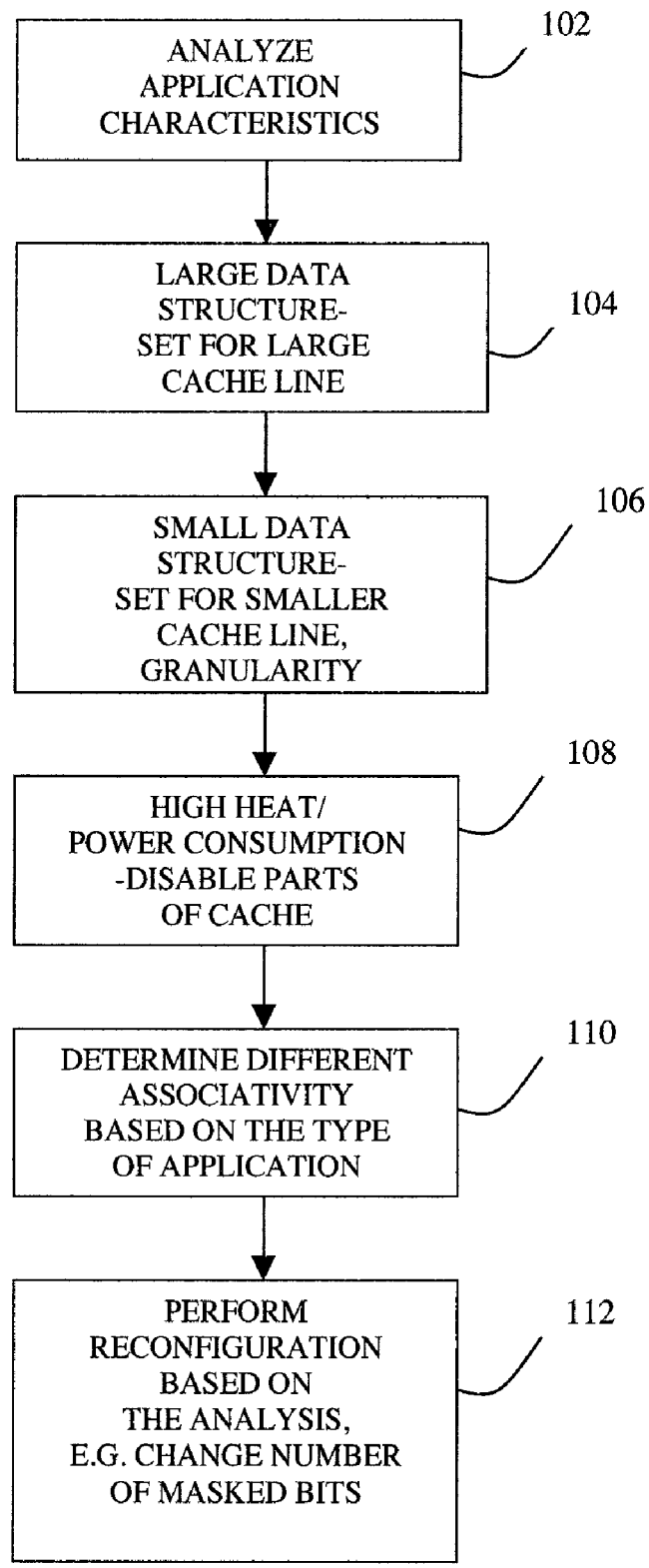
FIG. 1 is a flow diagram illustrating a method of the present disclosure in one embodiment of the present disclosure.

FIG. 1 is a flow diagram illustrating a method of the present disclosure in one embodiment. At 102, analysis is performed of an application for its cache memory access patterns and behavior. This analysis may be performed off-line in one embodiment. In another embodiment, the analysis is performed on-line while the application is running. In one embodiment, software such as an operating system may perform the analysis. The analyzed application's characteristics are evaluated and used to make a determination as to the type of reconfigurations that would optimize the cache usage during application's execution. The characteristics, for example, may include but are not limited to the data structure that the application is using, the expected reference pattern of the cache memory, whether the application references sparse or clustered chunk of code and data, the type of an application, heat and power consumption of the application, etc.

For instance, long cache lines typically perform better with large data structures. Thus, at 104, if it is determined that the application uses large data structures or a large region of allocated memory, the larger cache line configuration, is selected for this application. Data structure layout and sharing pattern may be analyzed on a multiprocessor to determine the optimal coherence granularity if for example a programmer has not performed cache alignment. By varying the coherence granularity the application behavior can be significantly improved. Many operating system data structures are small. Thus, when an operating system is executing, or any other application that uses smaller data structure is executing, the cache may be reconfigured to have smaller cache lines or smaller coherence granularity at 106.

In addition, if it is determined that the application is consuming high power or generating high heat, a part of the cache may be reconfigured to be disabled at 108, so that, for example, the chip will not get too hot. In some applications the critical working set is not the entire cache, so that performance need not be sacrificed to achieve a reduction in power usage or to reduce the temperature. Temperature sensors placed on or near processor cores may be used to determine how much heat an application is generating. A part of the cache may be disabled, for example, by setting enable/disable bit or bits to be associated with cache memory locations. The hardware or software accessing the cache then may read those bits to determine whether that part of the cache may be used or not used.

At 110, cache associativity may be reconfigured based on the type of execution entity. For instance, different types of applications may perform better with certain associativity. Associativity may be reconfigured, for example, by modifying a hashing algorithm or masking-off more or less number of bits in virtual or physical addresses for determining index and tag portions of associative cache memory. Although a higher associativity may mean a power cost and potentially a cycle cost, for applications that can benefit from a higher degree of associativity, there is potentially a considerable performance advantage that outweighs the power and cycle cost. For other applications a lower associativity will still achieve good performance, thus for those applications, the software or operating system can reduce the associativity and save power.

Reconfigurations with respect to other characteristics of cache memory are possible. At 112, cache memory is reconfigured, for instance, based on the determinations made above. The reconfiguration, in one embodiment, may be done by the hardware on the processor. The hardware, for instance, takes the information determined as above from the software and performs the modifications. A register may be set up per cache where the software may provide the hints for reconfiguring the cache memory.

Figure 2:
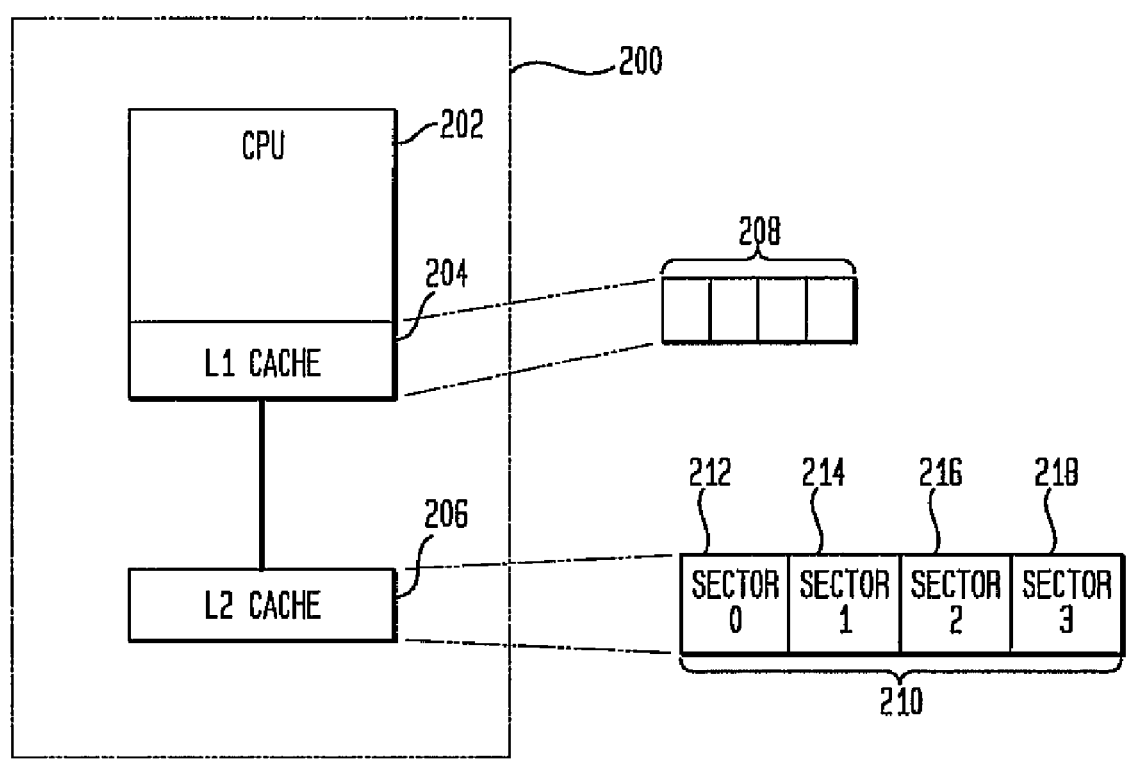
FIG. 2 is a block diagram illustrating cache memory that may be reconfigured in one embodiment of the present disclosure.

FIG. 2 is a block diagram illustrating cache memory that may be reconfigured. Briefly, a cache line refers to a unit of data that can be transferred to and from cache memory. Thus, cache line size determines the coherence granularity and what is fetched from memory. Different applications may perform better with different cache line sizes or coherence granularities. For instance, applications that use small data structure may only need to access small portions of a cache line and need not perform coherence on the entire line, while those that have larger data structure may perform better accessing the entire line. In an exemplary embodiment of the present disclosure, a cache line may be further divided into a plurality of sectors. In this embodiment, cache accesses or cache coherence granularity are performed by sectors.

Referring to FIG. 2, a computer system may comprise one or more processors and each processor 200 may comprise a central processing unit (CPU) 202 or the like, and a multi-level memory such as L1 cache 204 and L2 cache 206. In the example shown in FIG. 2, each cache line 210 in L2 cache 206 comprises 4 sectors, namely sector 0 (212), sector 1 (214), sector 2 (216) and sector 3 (218). While this example is shown with 4 sectors, any other number of sectors in a cache line is possible in the present disclosure. That is, a cache line may have any number of sectors greater than or equal to two.

In one embodiment, software may provide appropriate granularity information indicating that requested data in a memory region should be fetched with a suggested granularity. For example, software may indicate that, in case of an L1 cache miss on any address in a memory region, only the requested sector to be fetched from the corresponding L2 cache 206. As another example, software may also indicate that, in case of an L1 cache miss on any address in another memory region, the whole cache line, that is, all four sectors should be fetched from the corresponding L2 cache 206. In one embodiment, the granularity information may be maintained in tables such as a TLB (Translation Lookaside Buffer), the page table or the like, for instance, if a memory region is defined as one or more memory pages.

Figure 3:
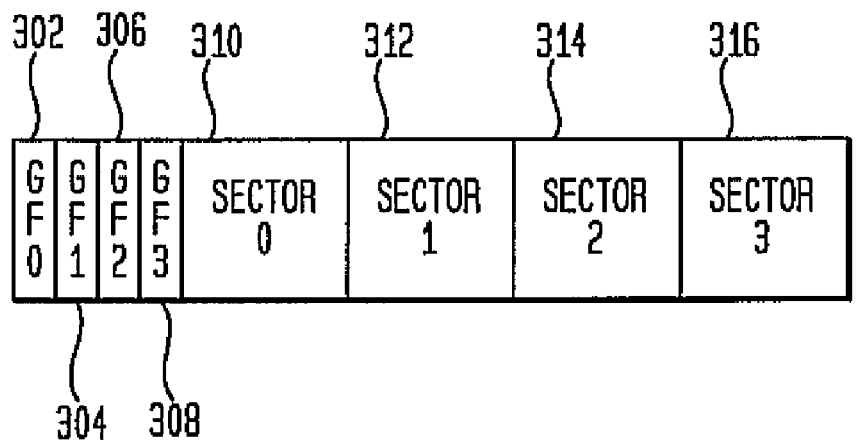
FIG. 3 illustrates an example of a cache line with associated granularity flags in one embodiment of the present disclosure.

In another embodiment, each L2 cache line maintains a granularity flag (GF) that indicates which one or more sectors of the requested cache line should be supplied to the L1 cache when the L2 cache 206 receives a cache request from the corresponding L1 cache 202. FIG. 3 illustrates an example of a cache line with associated granularity flags in one embodiment. For example, each L2 cache line 300 may maintain a GF bit per sector. FIG. 3 shows 4 GF bits 302, 304, 306, 308. Each GF bit (302, 304, 306, 308) corresponds to one sector (310, 312, 314, 316 respectively), indicating whether data of that sector should be supplied if data of another sector in the same cache line is requested. For instance, if GF bit 302 associated with sector 0 310 is set (for example, set to 1), when data in any one of sectors 1-3 (312, 314, 316) are requested, data in sector 0 is also supplied. Conversely, if GF bit 304 associated with sector 1 312 is not set (for example, set to 0), sector 1 312 would not be supplied when one or more of the other sectors 310, 314, 316 are requested and supplied.

Figure 4:
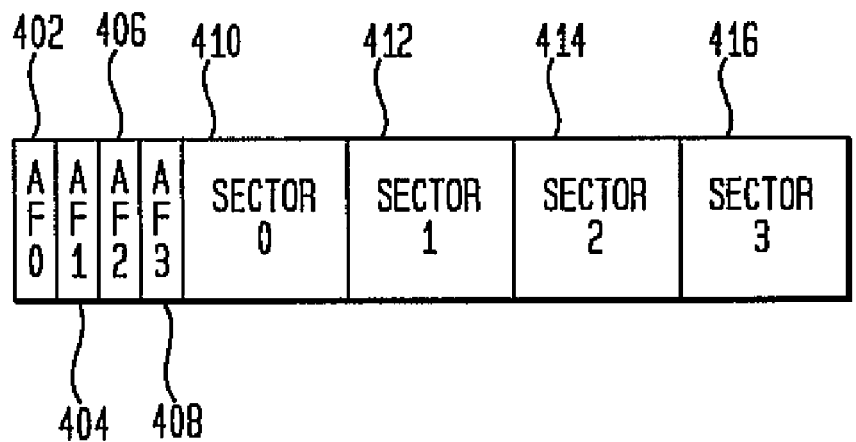
FIG. 4 illustrates an example of a cache line with associated access flags in one embodiment of the present disclosure.

At the L1 cache side, each L1 cache line maintains an access flag (AF) for each sector, indicating whether the corresponding cache sector has been accessed by the corresponding CPU since the time the data was cached. FIG. 4 illustrates an example of a cache line with associated access flags in one embodiment. Each sector 410, 412, 414, 416 may include correspondingly associated AF bits 402, 404, 406, 408. When data of a sector is brought into L1 cache, for example, from the corresponding L2 cache, the AF associated with that sector is set to 0. When the CPU accesses the data of a sector, the corresponding AF associated with that sector is set to 1. For instance, if sector 0 410 is brought into the cache line 400, the AF bit 402 associated with sector 0 410 is reset, for example, set to 0. The value of 0 in AF bit represents that the data of this sector has not been used yet. When the CPU or the like accesses the data of sector 0 410, the AF bit 402 associated with sector 0 410 is set to 1. The AF bit being set to 1 represents that the data of the sector associated with that AF bit was used.

Further, when an L1 cache line is replaced, the AF flags can be used to update the corresponding GF flags in the L2 cache. For instance, take for example, the cache line 400 of FIG. 4. If AF bit 404 associated with sector 1 412 is set to 1, representing that the data of sector 1 412 was used, when the cache line 400 is replaced, the GF bit value in the L2 cache for the corresponding sector may be updated to 1. With this simple adaptive granularity scheme, when an L2 cache receives a cache miss request from the corresponding L1 cache, the L2 cache can supply not only data of the requested cache sector, but also data of other sectors in the same cache line provided that those sectors were accessed by the CPU the last time they were supplied to the corresponding L1 cache. In one embodiment of the present disclosure, the addressing into the individual sectors in a cache line may be performed using an address of the cache line and offsetting the number of address bytes from the cache line address.

Although the above examples were described with respect to L1 cache as a requestor and L2 cache as a supplier of data, it should be understood that the scheme explained above may be used between any levels of caches, for instance, between L2 and L3 caches, L3 cache and main memory, L2 cache and main memory, etc.

Splitting a cache line into a plurality of sectors helps in reducing the number of cache misses as well as the number of operations required to maintain cache coherence. For instance, two processors that access the same cache line, but different sectors in the line may perform updates to the respective sectors independently from one another without having to invalidate the other's cache line.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for reconfiguring cache memory, comprising:

analyzing one or more characteristics of an execution entity accessing a cache memory; and reconfiguring the cache dynamically based on the one or more characteristics analyzed, the step of reconfiguring including modifying associativity of the cache memory, modifying amount of the cache memory available to store data, changing coherence granularity of the cache memory, or modifying line size of the cache memory, or combination thereof, wherein the cache memory further includes higher level cache memory and lower level cache memory, each cache line of the lower level cache memory divided into a plurality of sectors, associating a granularity bit with each sector of a cache line in the lower level cache memory, the granularity bit for indicating whether a sector should be cached into the higher level cache memory from the lower level cache memory when one or more other sectors in the cache line are cached into the higher level cache memory from the lower level cache memory.

2. The method of claim 1, wherein the one or more characteristics of an execution entity include size of data structure used by the execution entity, expected reference pattern of the execution entity, heat generated by the execution entity, or combination thereof.

3. The method of claim 1, wherein the step of analyzing includes reading temperature data associated with the execution entity to determine amount of heat generated by the execution entity.

4. The method of claim 1, wherein the step of reconfiguring includes changing number of masked bits for mapping into cache memory to modify cache memory associativity.

5. The method of claim 1, wherein the step of reconfiguring includes:

dividing a cache line in the cache memory into a plurality of sectors; and accessing data of the cache line by one or more sectors.

6. The method of claim 5, further including:

instructing hardware as to which memory region should be cached by sectors and which memory region should be cached by entire cache lines.

7. The method of claim 5, further including:

associating an access bit with each sector of a cache line; and setting an access bit to true if a processing element uses data of a sector associated with the access bit.

8. The method of claim 7, wherein the step of associating includes:
  associating an access bit with each sector of a cache line in level-1 cache.

9. The method of claim 1, wherein the step of associating includes:
  associating a granularity bit with each sector of a cache line in level-2 cache, the granularity bit for indicating whether a sector should be cached when one or more other sectors in the cache line are cached.

10. The method of claim 1, wherein the step of analyzing is performed on-line while the execution entity is being run.

11. The method of claim 1, wherein the step of analyzing is performed off-line.

12. The method of claim 1, wherein the step of analyzing is performed by software.

13. The method of claim 1, wherein the step of analyzing is performed by an operating system.

14. A system for reconfiguring cache memory, comprising:
  a means for analyzing one or more characteristics of an execution entity accessing a cache memory; and
  a means for reconfiguring the cache dynamically based on the one or more characteristics analyzed, the means for reconfiguring including a means for modifying associativity of the cache memory, modifying amount of the cache memory available to store data, changing coherence granularity of the cache memory, or modifying line size of the cache memory, or combination thereof,
  wherein the cache memory further includes higher level cache memory and lower level cache memory, each cache line of the lower level cache memory divided into a plurality of sectors, and wherein a granularity bit is associated with each sector of a cache line in the lower level cache memory, the granularity bit for indicating whether a sector should be cached into the higher level cache memory from the lower level cache memory when one or more other sectors in the cache line are cached into the higher level cache memory from the lower level cache memory.

15. The system of claim 14, wherein the one or more characteristics of an execution entity include size of data structure used by the execution entity, expected reference pattern of the execution entity, heat generated by the execution entity, or combination thereof.

16. The system of claim 14, wherein the means for analyzing includes a means for reading temperature data associated with the execution entity to determine amount of heat generated by the execution entity.

* * * * *